May 18, 1926.
J. W. MacCLATCHIE
WEIGHT INDICATOR
Filed Jan. 5, 1924
1,584,958
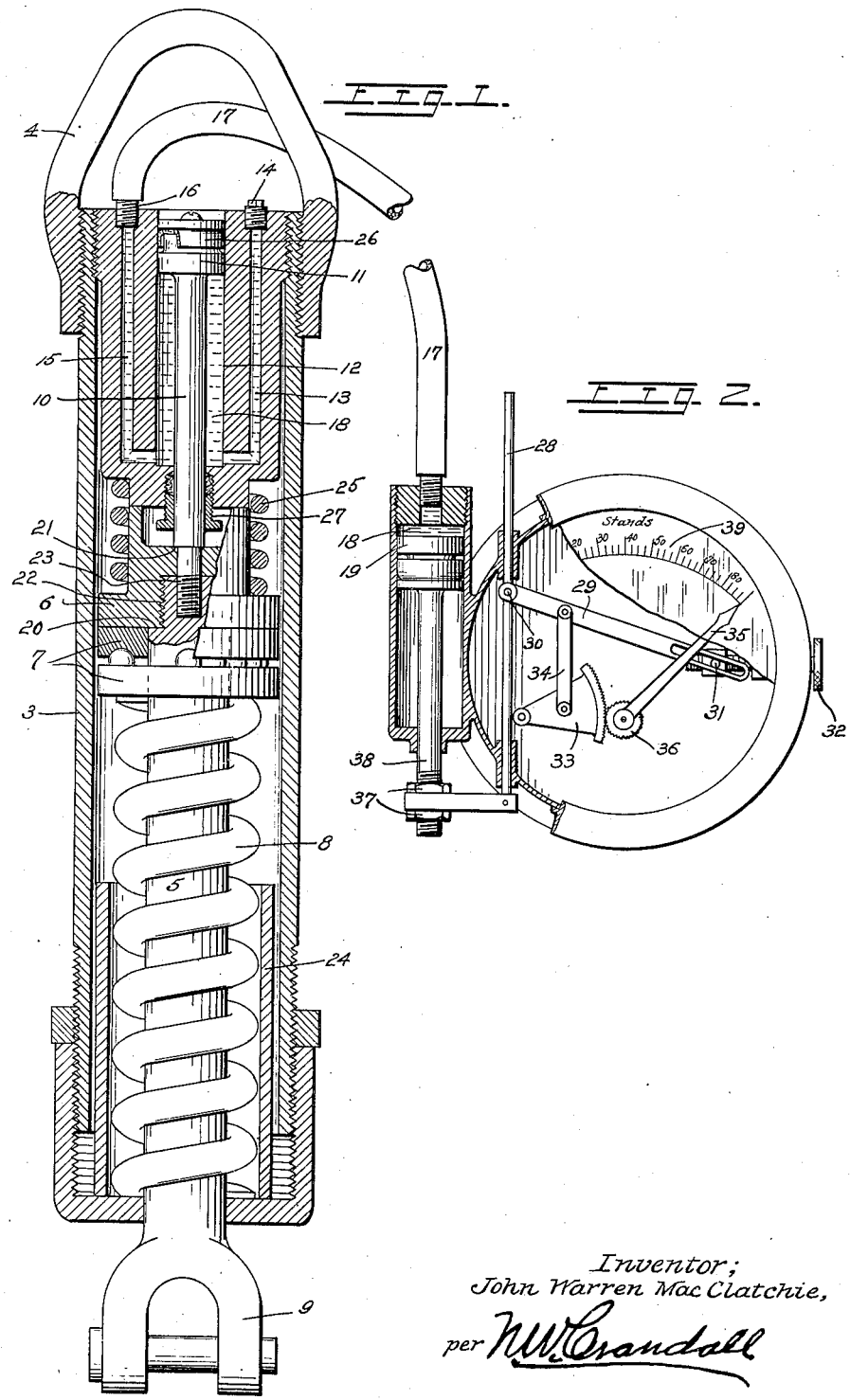
Inventor;
John Warren MacClatchie,
per N.W. Crandall
Attorney.

Patented May 18, 1926.

1,584,958

UNITED STATES PATENT OFFICE.

JOHN WARREN MacCLATCHIE, OF COMPTON, CALIFORNIA.

WEIGHT INDICATOR.

Application filed January 5, 1924. Serial No. 684,569.

In this specification, and the accompanying drawing, I shall describe and show a preferred form of my invention, and specifically mentioned certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to weight indicators used in connection with rotary drilling of deep wells and similar operations, and a principal object is to enable the operator to closely determine the effective weight imposed upon the underground bit. Another object is to increase the efficiency of drilling by subjecting the bit to the loading under which the material will be cut to the greatest advantage. A still further object is to reduce breakage of the bits by preventing their being unduly overloaded while drilling.

My objects are attained in the manner illustrated in the accompanying drawing, in which—

Figure 1 is a central section of the weighing mechanism of my improved device in elevation; and Figure 2 is an elevation, shown partly in section, of one form of indicating instrument adapted to be used in conjunction therewith.

Similar reference numerals refer to similar parts throughout both views.

In drilling deep wells by rotary methods it is customary to support a large portion of the weight of the drill stem and attached tools from the crown block, and to allow only what is judged to be sufficient weight to rest upon the bit to enable it to function properly. The methods hitherto in vogue do not permit of this being done with precision and it is only by accident, and for short periods at a time, that the pressure approximates what should properly be applied. Obviously this results in low drilling efficiency, and relatively heavy breakage or damage to the cutting edges of the bits.

In my method the weighing mechanism illustrated in Fig. 1 is introduced directly into the tool string and, in connection with the indicating device, enables the operator to determine both the weight of the string and the portion of this weight that rests upon the cutting edges of the underground bit.

My weighing mechanism comprises a tubular shell 3 having an axially bored cap at the lower end and a bail 4 at the top by which it can be hung from the traveling block of the drill rig. Within the shell is a weigh rod 5 hung from a flange fitting 6, supported by a thrust bearing 7 resting upon a weighing spring 8. The weigh rod is provided at its lower end with a shackle 9, or other convenient means, for attaching the swivel head of the drilling rig from which the square rod and tool string are suspended. The whole weight of the tool, string, except such portion of its as rests upon the bit, may thus be supported upon spring 8, and the degree of compression of the latter thus becomes a means for determining the weight upon the bit when the weight of the string is known.

Connected with the plunger 5 by stem 10 is a hydraulic piston 11 adapted to work within cylinder fitting 12 mounted in the upper end of shell 3. A filling duct 13, normally closed by plug 14, communicates with the bottom of the cylinder, and a similar duct 15 leads from the cylinder bottom to nipple 16 and hose 17. By means of the latter and fluid 18 any displacement of piston 11 is made to produce a corresponding displacement of a similar piston 19 in a suitable displacement gage such as is shown in Fig. 2.

I prefer to connect weigh rod 5 and stem 10 in the manner indicated in Fig. 1, the stem passing freely through fitting 6 and being tapped into the end of the weigh rod. The latter is tapped into fitting 6 and is shoulder-seated against it at 20. The stem 10 is shoulder-seated against the fitting at 21. If threads 22 and 23 in this case are of the same hand, the construction tends to become self locking.

Within the shell the cylinder 24 surrounds spring 8 and is of such length as to properly limit the compression of this spring. Above fitting 6 is a helical spring 25 adapted to act as a buffer in case the tool string should part and thus suddenly terminate the downward pull on weigh rod 5. Cup leather 26, and gland 27, serve to prevent leakage of liquid from the displacement cylinder in fitting 12.

The indicating portion of my device may consist of any suitable instrument adapted for actuation by liquid displacement. One such form is illustrated in Fig. 2 but does not constitute, as to form, a part of the present invention and is not claimed herein per se. In the illustrated form of instrument the piston 19 is actuated by the displacement of piston 11, through hose 17, in the manner described. Its movement is communicated to slide rod 28, and lever 29 pivoted to the latter at 30. This lever is variably fulcrumed at 31 by means of the adjusting nut 32. Its motion is communicated to sector 33 by means of link 34, and the sector moves indicating hand 35 by means of the pinion 36. Nuts 37, at the lower end of piston stem 38, serve to adjust the position of the needle relative to scale 39 in a manner that will be explained. The scale is divided to represent the number of stands of drill pipe resting upon the bit, or in any other convenient manner.

In operation the string of drill pipe with the bit attached is hung from shackle 9 and lowered into the well hole until the bit strikes the bottom. As soon as this takes place part of the weight of the string is supported by the bit, and this portion of the weight is indicated on scale 39 by needle 35. Lowering of the string is continued until the proper amount of weight is on the bit, and this weight is maintained by lowering the string as the drilling advances. The exact drilling weight is at all times within the knowledge of the operator and it is possible by means of this device to greatly improve the efficiency of the drilling and reduce losses due to breakage of bits.

I claim as my invention:

1. A weight indicator comprising, in combination; a body member supporting a vertical cylinder; a reciprocable piston within the cylinder having a stem whereby it may be displaced; a vertically slidable rod upon the body member adapted for having a load suspended therefrom and engaging said stem; a spring upon the body member adapted to oppose downward movement of said rod; and means for indicating weights proportional to the deflection of the spring by the displacement of liquid by said piston; said indicating means being substantially independent of pressure variations in said liquid.

2. A weight indicator comprising, in combination; a suspendable body member supporting a vertical cylinder; a reciprocable piston within the cylinder having a stem extending through the cylinder head; a vertically slidable rod upon the body member adapted for having a load suspended therefrom and engaging said stem, whereby said piston may be displaced; a spring upon the body member adapted to resist downward movement of said rod in proportion to its deflection; and means for indicating weights proportional to the deflection of the spring by the displacement of liquid by said piston; said indicating means being positioned independently of the body member and being substantially independent of pressure variations in said liquid.

3. A weight indicator comprising, in combination; a suspendable body member supporting a vertical cylinder; a reciprocable piston within the cylinder having a stem whereby it may be displaced; a vertically slidable rod upon the body member adapted for having a load suspended therefrom and engaging said stem; a helical spring surrounding the rod adapted to resist downward movement of the rod in proportion to its deflection; and a gage flexibly connected to said cylinder by tubing, whereby weights proportional to the deflection of said spring may be indicated by the displacement of liquid by said piston; the indications of said gage being substantially independent of variations of elevational difference between said cylinder and gage.

JOHN WARREN MacCLATCHIE.